United States Patent Office 3,474,164
Patented Oct. 21, 1969

3,474,164
NOVEL COMPOUNDS AND METHOD FOR
COMBATING MICROORGANISMS
Cyril Woolf, Morristown, and Arleen C. Pierce, New
Brunswick, N.J., assignors to Allied Chemical Corporation, New York, N.Y., a corporation of New York
No Drawing. Filed Nov. 17, 1966, Ser. No. 595,039
Int. Cl. A61k 27/00; C07d 3/00
U.S. Cl. 424—279                                   7 Claims

ABSTRACT OF THE DISCLOSURE $\beta,\beta$-bis(perhalomethyl)-$\beta$-propiolactones of the formula:

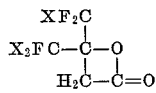

wherein X is independently selected from the group consisting of F and Cl, are effective antimicrobic agents and are effective against *Staphylococcus aureus* cells.

This invention relates to certain novel compounds and to a method for combating microorganisms, especially bacteria, preferably by treating them with a chemical agent in vapor phase.

The problem of combating microorganisms, meaning in the context of this discussion killing and preventing or retarding the propagation of microorganisms, is common to a number of industries such as the food, agricultural and pharmaceutical industries, and is particularly significant to the medical profession. The usual methods of sterilization such as steam, heat, chemical solution, radiation, and the like, are impractical when large areas such as hopsital rooms, laboratories and animal quarters are desired to be sterilized or when it is desired to sterilize delicate laboratory and medical equipment, which may contain plastics, fabrics, and the like, that may be adversely affected by moisture and heat.

The term sterilization is generally interpreted as referring to a condition in which a body or locus is freed from all living microorganisms as opposed to being only from certain microorganisms.

The problem of freeing a body from all living microorganisms is no mean one because, although many varieties of microorganisms are relatively easy to combat, others have particularly high resistances to adverse conditions and are exceedingly difficult to combat. Such a microorganism is the bacteria *Staphylococcus aureus*. Unfortunately, such bacteria are commonly found in hospitals and food and are responsible for a large number of human fatalities every year. Because *Staphylococcus aureus* cells are so difficult to combat in comparison with other microorganisms, researchers have used these cells as standards for sterilization tests. It is presumed that, if a given chemical agent is effective in combating *Staphylococcus aureus* cells, it will be effective in combating other varieties of vegetative cells. The converse of this is, of course, not true. Experience has proved this to be the case. An illustrative standard test that is widely used is the so-called F.D.A. Method (Food and Drug Administration Method) as published by Ruehle and Brewer in 1931. (See Porter, Bacterial Chemistry and Physiology, John Wiley & Sons, Inc., N.Y. (1946), p. 226). This method requires tests of disinfectant or antiseptic action to be carried out against strains of *Staphylococcus aureus*. The problem of sterilizing large areas and of sterilizing heat- or water-sensitive materials has been alleviated by the use of antimicrobic agents in vapor phase. Effective vapor phase antimicrobic agents must be capable of being readily introduced into the vicinity of the area to be treated; of rapidly and thoroughly penetrating porous surfaces in the area; of effectively penetrating, while in vapor phase, the microorganisms to be treated; of destroying the microorganisms over a wide range of temperatures and humidities; and of permitting ready removal by aeration. Unfortunately, many chemical agents, while possessing good antimicrobic activity, are not capable of functioning effectively in vapor phase for lack of one or more of the above-noted requirements. Bactericidal agents, for example, which have high vapor pressures and may be vaporized easily, may still not possess the penetrability properties required for effective vapor phase use.

It is a major object of this invention to provide a novel method for combating microorganisms such as bacteria, fungi, and the like.

Another object of the invention is to provide certain novel chemical compounds.

It is another object of the invention to provide a novel method for effectively combating microorganisms such as bacteria, fungi and the like over a wide range of relative humidity conditions.

Yet another object of the invention is to provide a novel sterilization method.

It is a more particular object of the invention to provide a novel method for combating bacteria.

A still more specific object of the invention is to provide a novel method for combating *Staphylococcus aureus* cells.

A preferred object of the invention is to provide a novel method for combating microorganisms, particularly bacteria, comprising treating them with a chemical agent in vapor phase.

The preferred, most specific object of the invention is to provide a novel method for combating *Staphylococcus aureus* cells by treating them with a chemical agent in vapor phase.

It has been found that the above-stated method objects of the invention are accomplished by treating microorganisms, particularly *Staphylococcus aureus* cells, with a $\beta,\beta$-bis(perhalomethyl)-$\beta$-propiolactone of the formula:

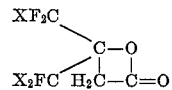

wherein X is independently selected from the group consisting of F and Cl. One subclass of $\beta,\beta$-bis(perhalomethyl)-$\beta$-propiolactones as described above are those in which all the X atoms are F. Another subclass of $\beta,\beta$-bis(perhalomethyl) - $\beta$-propiolactones as described above are those in which all the X atoms are Cl. Such compounds have been found to exhibit extremely high activity at both high and low humidities. The novel antimicrobic agents of the invention will be referred to hereafter as "the subject propiolactones." In accordance with the preferred objects of the invention, the subject propiolactones may be used effectively in vapor phase.

The subject propiolactones may be prepared by standard techniques such as by reacting an appropriate perhalogenated acetone of the formula:

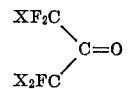

wherein X is as defined heretofore, with ketene, in liquid phase, at temperatures below 40° C. and preferably at temperatures between about −100° C. and 0° C.

Stoichiometry of the reaction requires equimolar amounts of the acetone and ketene reactants.

The reaction will proceed readily in the absence of a solvent. Preferably, however, a solvent is employed in order to assist in dissipating reaction exotherm. Solvents suitable are organic liquids which are inert to the reaction and which remain liquid at the temperatures employed. Illustrative solvents which meet these requirements include diethyl ether and carbon tetrachloride. Other suitable solvents will readily occur to those skilled in the art.

Subject propiolactones of the above given formula wherein at least one of the X atoms is Cl are novel compounds and fulfill the novel product objective of the invention.

Specific compounds coming within the scope of the term "subject propiolactones" include the following:

β,β-bis(trifluoromethyl)-β-propiolactone
β,β-bis(chlorodifluoromethyl)-β-propiolactone
β-chlorodifluoromethyl,β-trifluoromethyl-β-propiolactone
β-dichlorofluoromethyl,β-trifluoromethyl-β-propiolactone
β-chlorodifluoromethyl,β-dichlorofluoromethyl-β-propiolactone The subject propiolactones may be used to treat microorganisms by contacting the microorganisms to be treated, or surfaces containing the same, with the subject propiolactones in the form of solutions, sprays, mists, dusts, or in accordance with the preferred embodiment, in vaporous state. The subject propiolactones may be used alone or in admixture with vaporous, solid or liquid diluents such as air and water or hydrocarbon liquids, with or without any of the well-known anionic, cationic or non-ionic surface-active weting agents. Such agents include, for example, alkali metal salts of higher fatty acids, water-soluble salts of sulfated higher fatty alcohols, water-soluble aryl sulfonates, and quaternary ammonium bases such as trialkyl benzyl ammonium chloride. In the preferred vapor phase embodiment, a subject propiolactone may be conveniently employed such as by vaporizing it in a closed area in which the microorganism-containing surfaces to be treated are located or by using a vaporous diluent such as air which may be bubbled into the liquid propiolactone and then the propiolactone-laden air used to fumigate a closed space surrounding the microorganism-containing surfaces to be treated.

As is well known in this art, dosages of a given antimicrobic agent can vary widely depending upon the particular organism to be controlled, the area of the locus to be treated, the time in which control is desired to be established, and environmental conditions such as temperature, relative humidity, etc. In any event, sufficient concentrations of the subject propiolactones should be utilized in order to effectively combat the microorganisms to be treated, that is to say, in order to maximize the killing of existing living bacteria and the prevention of propagation of the same in the same locus for a significant period of time. The dosages that will be required in a particular case to accomplish these ends are readily ascertainable and are thus within the skill of the art.

The subject propiolactones can be employed as the sole active ingredient in combating microorganisms; however, if desired, they can be combined with active materials such as other antimicrobic agents or growth inhibitors to achieve special results or with nonactive components such as perfumes, propellant aids, and the like.

EXAMPLE 1

1.0 mol of ketene was condensed into about 250–300 ml. diethyl ether at a temperature of −72° C. The temperature of the mixture was maintained at that level while 1.0 mol of 1,3-dichlorotetrafluoroacetone was added over a one-half hour period. After mixing thoroughly, the resulting mixture was allowed to warm up to room temperature. Phosphorus pentoxide was added and the mixture was allowed to stand for a period of 36 hours. At the end of this period the solids were filtered off, the filtrate was condensed in a rotary evaporator and the residue was distilled on a spinning band column. The product was a colorless liquid having a boiling point of 153–154° C. and an index of refraction of $n_D^{22°\ C.}$ 1.3864. The product was identified as being β,β - bis-(chlorodifluoromethyl)-β-propiolactone. Yield obtained was 12% by weight.

*Analysis.*—Calculated for $C_5H_2O_2Cl_2F_4$: C, 24.89%; H, 0.84%; Cl, 29.4%; F, 31.5%. Found: C, 25.49%; H, 0.98%; Cl, 29.5%; F, 31.3%. The infrared spectrogram of this product was consistent with the expected structure.

EXAMPLE 2

1.48 mols of ketene were condensed into 250–300 ml. diethyl ether at a temperature of −78° C. The temperature of the mixture was maintained between about −88° C. to −78° C. while 1.48 mols of hexafluoroacetone were added over a two hour period. After mixing thoroughly, the resulting mixture was allowed to warm up to room temperature. Phosphorus pentoxide was added and the mixture was allowed to stand overnight. The resulting mixture was then filtered and the filtrate distilled on a spinning band column to yield a colorless liquid boiling at 91–93° C. and having an index of refraction of $n_D^{22°\ C.}$ 1.3095. The product was identified as being β,β-bis(trifluoromethyl) - β - propiolactone. Yield was 48.2% by weight. Identity was confirmed by infrared analysis.

EXAMPLES 3–6

One-tenth ml. portions of propiolactone compound test materials were charged to one-liter flasks. Circular patches of cotton cloth, each having an area of about 2 cm.$^2$ and each impregnated with an aqueous suspension of about $5 \times 10^6$ *Staphylococcus aureus* cells and subsequently dried, were suspended by wires about half-way down into the flasks. The flasks were stoppered and the patches containing the bacteria were exposed to the subject propiolactone compound vapor for a period of one hour. The exposures were conducted at room temperature (about 20–31° C.) and were duplicated in an atmosphere of 90% relative humidity and an atmosphere in which the relative humidity was from 30 to 76%. Relative humidities in the bottles were elevated by flushing with air passed through water. At the end of the exposure periods the patches were removed and assayed for viable organisms by the pourplate method as follows: The patches were placed in dilution blanks composed of aqueous solutions of 0.1% lecithin v./v. and 0.71% Tween 80 (trademark of Atlas Powder Co. for an emulsifier comprising a polyoxyalkylene derivative of sorbitan monooleate) v./v. and adjusted to pH 7 with 1 N NaOH. Organisms remaining on the patches were dislodged by shaking and aliquots were plated in enriched nutrient agar. After incubating for 48 hours at 37° C., the percentage of organisms killed (attributable to the action of the subject propiolacetone compound test material) was calculated by comparison of the number found after testing with an assay of unexposed contaminant patches. Bacteria counts were made with a Quebec Colony counter. Average results of the above described tests are shown in the following table.

TABLE

| Ex. | Test compound | Relative humidity, percent | Percent of bacteria killed at the end of one hour |
|---|---|---|---|
| 3 | β,β-bis(chlorodifluoromethyl)-β-propiolactone. | 90 | 100 |
| 4 | ....do.... | 30–76 | 100 |
| 5 | β,β-bis(trifluoromethyl)-β-propiolactone. | 90 | 100 |
| 6 | ....do.... | 30–76 | 100 |

We claim:
1. The method for combating bacteria and fungi which comprises treating said microorganisms with an effective amount of a β,β-bis(perhalomethyl)-β-propiolactone compound of the formula:

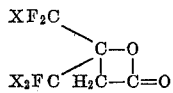

wherein X is independently selected from the group consisting of F and Cl.

2. The method of claim 1 which all the X atoms are Cl.
3. The method of claim 1 in which the β,β-bis(perhalomethyl)-β-propiolactone compound is employed in vapor phase.
4. The method of claim 1 in which the microorganisms treated are bacteria.
5. The method of claim 1 in which the microorganisms treated are *Staphylococcus aureus* cells.
6. The method of claim 1 in which the β,β-bis(perhalomethyl)-β-propiolactone compound is β,β-bis(chlorodifluoromethyl)-β-propiolactone.
7. The method of claim 1 in which the β,β-bis(perhalomethyl)-β-propiolactone compound is β,β-bis(trifluoromethyl)-β-propiolactone.

References Cited

UNITED STATES PATENTS 2,989,435   6/1961   Walop et al.

FOREIGN PATENTS 1,136,323   9/1962   Germany.

OTHER REFERENCES

Bernheim, Frederick et al., Proceedings of the Society for Experimental Biology and Medicine. vol. 80, pp. 162–164, 1952.

ALBERT T. MEYERS, Primary Examiner
JAMES V. COSTIGAN, Assistant Examiner

U.S. Cl. X.R.
260—343.9